INVENTOR.
MICHIAKI ITO

United States Patent Office 3,518,007
Patented June 30, 1970

3,518,007
MEASURING DEVICE UTILIZING THE DIFFRACTION OF LIGHT
Michiaki Ito, Tokyo, Japan, assignor to Nippon Electric Company, Limited, Tokyo, Japan, a corporation of Japan
Filed May 11, 1966, Ser. No. 549,245
Claims priority, application Japan, May 17, 1965, 40/28,953
Int. Cl. G01b 9/08
U.S. Cl. 356—166       1 Claim

ABSTRACT OF THE DISCLOSURE

A dimension measuring device includes a laser for producing coherent light beams having an ellipsoidal wave front. The object to be measured is supported in the path of the light beam and a collimator including a plurality of lenses arranged in telescopic tandem is interposed between the laser and the object for adjusting the shape of the wave front. Means are also included for identifying the pattern of the diffracted light.

---

This invention relates generally to the measurement of the shape and dimensions of an object and, in particular, to a device which utilizes Fresnel's diffraction phenomenon of a monochromatic ellipsoidal wave to effect such a result.

Conventional devices for precisely measuring the shape and dimensions of an object include mechanical devices, such as a scale with a vernier, a micrometer calipers, etc.; geometrical-optical measuring devices, such as the universal projector and tool-maker's microscope; and physical-optical measuring devices, such as a Michelson interferometer.

Each of these devices have their respective technical defects. Mechanical measuring devices must be brought into direct contact with the object to be measured and consequently cannot be used where the object is at substantially elevated or low temperatures, in atmospheres capable of causing dangerous chemical reactions, or where the object is soft and easily deformed. While geometrical-optical measuring devices do not experience these disadvantages, it has been found that in practical use, increasing the magnification to improve the accuracy can only be achieved by bringing the objective lens nearer to the object, with a resulting reduction in the relative depth of the focus. The physical-optical measuring device has fairly high precision but is very inconvenient and is unsuitable for general measurements.

Accordingly, it is the object of this invention to provide a measuring device of simple construction, which enables the shape and the dimensions of an object to be precisely measured at a remote location.

Briefly, the invention is predicated upon the distinct diffraction pattern obtained by illuminating the object with the output of a gas or other laser; the output being in the $TEM_{00}$ mode and monochromatic with a well defined substantially confocal ellipsoidal wave front. This invention utilizes the well known Fresnel's diffraction phenomenon (including the Fraunhofer's diffraction phenomenon as the limiting case).

Presumably, the reason why the diffraction phenomenon has not been used in this type of measurement is that conventional light sources are distributed and not coherent. Hence, light beams incident upon a slit will not produce higher order diffraction patterns which may be observed on a screen to determine the shape and the dimensions of the slit, but produce images of the light source unrelated to the slit (like the image produced with a pinhole camera). While it might appear that such a defect is obviated by collimating the light beams into a pencil of parallel beams, the low brightness of conventional light sources makes larger diffraction angles impractical and thus it is difficult to improve accuracy.

It has been found that the light beam emitted from a gas laser having a spherical Fabry-Perot resonator (such as the gas laser disclosed in "Laser" by B. A. Lengyel, John Wiley & Sons, Inc., New York, 1962, p. 93, Fig. 7) has a well defined substantially spheroidal wave front, and that this light, after having passed through a centered lens system, undergoes a change in propagation behaviour; the change appearing in the center and the focal circle of the spheroidal wave front. It is therefore possible by use of a cylindrical lens or lenses to provide the laser light with a more general ellipsoidal wave front (including a circular cylindrical wave front as a limiting case).

Thus, the laser light may produce distinct diffraction patterns useful for a variety of measurements.

The above mentioned and other features and objects of this invention and the manner of attaining them will become more apparent and the invention itself will best be understood by reference to the following description of an embodiment of the invention taken in conjunction with the accompanying drawings wherein.

Figure 1:
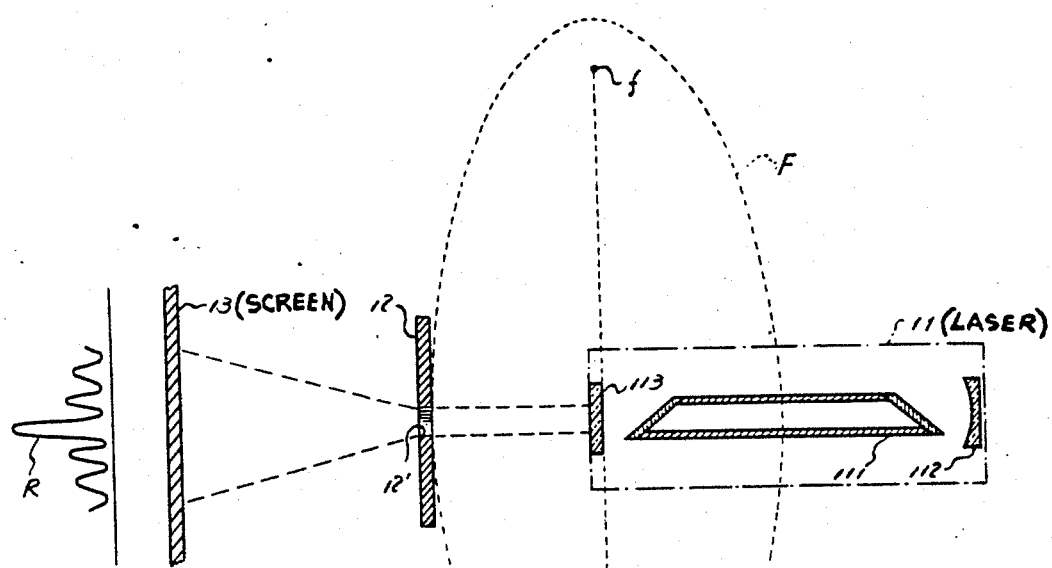
FIG. 1 is a schematic sectional view of an embodiment of this invention.

Referring now to FIG. 1, the depicted embodiment is a device for examining whether the dimension of a circular hole formed through a thin metal plate is within predetermined tolerances. The essential components of the measuring device are a gas laser 11 and a flat screen 13 onto which the diffraction pattern is projected. Between these components, the metal plate 12 is disposed with an attitude such that the circular hole 12', formed therein, is substantially perpendicular to the optical axis of the laser 11 and is illuminated by the output light.

The laser 11 of the type referred to in the above-mentioned Lengyel article and comprises: a helium-neon gas discharge tube 111; a spherical mirror 112 and a plane mirror 113 disposed on both sides of the discharge tube with coaxial optical axes so as to form a Fabry-Perot resonator; and a power source (not shown) for exciting the discharge tube. The laser 11 should preferably be of the type that produces oscillations only for a single transition between the atomic energy levels and with a single mode of oscillation (customarily designated at $TEM_{00}$). The red light (of 0.6238-micron wave length) emitted from a Nippon Electric Company, Ltd. helium neon gas laser has proven quite satisfactory.

The wave fronts or equi-phase surfaces of the light produced by the laser 11 are (according to calculated results) "confocal" spheroidal surfaces, such as F, whose foci are on a circle $f$ lying in the same plane as the plane mirror 113 and having its center at the point of intersection between the plane mirror 113 and the optical axis of the laser 11 and its radius determined by:

$$\sqrt{D(r-D)}$$

where $r$ is the radius of curvature of the spherical mirror 112 and $D$ is the distance between the mirrors 112 and 113 (selected to be smaller than the radius $r$).

The intensity distribution of the laser light is proportional to $e^{-Ab^2}$, where $b$ is the distance as measured perpendicularly from the optical axis and A is given by $$A = \frac{2\pi}{\lambda} \cdot \frac{\sqrt{D(r-D)}}{D(r-D)+z}$$

and $\lambda$ is the wave length of the laser light and $z$ is the distance from the center of the spheroid to the wave front.

Where the diameter of the output beam of laser 11 is sufficiently smaller than the radius $a$ of the circular hole 12' ($Aa^2$ is sufficiently greater than unity), the laser light passes through the circular hole without substantial diffraction caused by the circular hole. It is therefore necessary in order to effect a diffraction pattern, that the diameter of the light beam is comparable to the radius of the circular hole 12' and that $Aa^2$ is consequently less than or approximately equal to unity. The intensity distribution of the light diffracted into a direction forming an angle B with the optical axis of the laser 11 is:

$$\left| \int_0^a e^{-Ab^2} \cdot J_0\left(B \cdot \frac{2\pi}{\lambda} \cdot b\right) b \cdot db \right|^2$$

where $J_0$ denotes the Bessel function of the zeroth order. Consequently, concentric fringes are observed on the flat screen 13, which have intensity distribution shown by the curve R (FIG. 1) in the radial direction of the circle. If the hole 12' is not of the exact circular shape, but is somewhat distorted, the diffraction pattern is accordingly distorted. As is clear from the above formula, the spacing between neighboring concentric fringes becomes greater with a decrease in the radius $a$ of the circular hole 12'. It is therefore possible to ascertain whether the radius $a$ falls within the prescribed tolerance by observing whether the separation of fringes corresponds to those allowable for the radius $a$.

The accuracy of the measuring device according to the invention depends only on the angle of diffraction B, and so increases with the distance between the screen 13 and the metal plate 12.

Although the embodiment has been described in conjunction with measurement of a circular hole 12' in a metal plate 12, it is to be understood that objects other than a circular hole may be measured in a like manner.

As mentioned above, it may sometimes be impossible to make the diffraction pattern produced on the screen 13 easily visible if the relation between the diameter of the laser beam and the radius $a$ of the circular hole 12', or between A and $a$, is not appropriate. The simplest method for adjusting the relation between A and $a$ is to vary the distance between the laser 11 and the metal plate 12. This method, however, provides only a very limited range of adjustment. The result desired may be attained by means of a collimator for transforming the shape of the wave front and the radius of the above-mentioned focal circle. The least complex collimator may be formed of a simple lens interposed between the laser 11 and the metal plate 12. This, however, is not completely satisfactory because only a narrow range is available for the movement of the lens and further, a variation in the shape of the wave front adversely affects the correspondence between the diffraction patterns obtained by different collimators. These disadvantages and objections are obviated by the collimator shown in FIG. 2.

Figure 2:
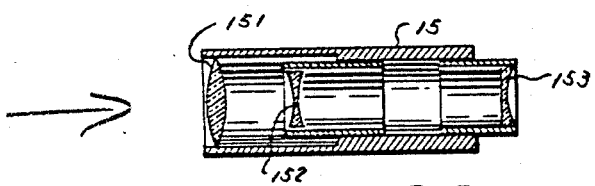
FIG. 2 is a sectional view of a collimator for use with the embodiment of FIG. 1.

The collimator 15 of FIG. 2 is intended for interposition between the laser 11 and the metal plate 12 of the embodiment of FIG. 1. It comprises a convex lens 151 and concave lenses 152 and 153. These lenses are supported by three hollow cylinders coupled telescopically so that the relative distances are adjustable. With this collimator, it is possible to vary the radius of the focal locus with the distance between the beam waist and the slit remaining unchanged.

Figure 3:
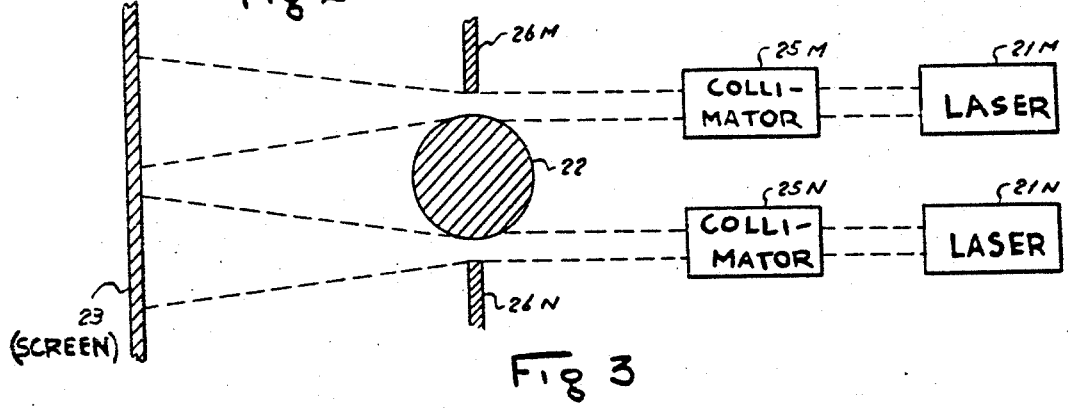
FIGS. 3 and 4 are axial sections of alternative embodiments of this invention.

Referring now to FIG. 3, there is shown an alternative embodiment for the case where suitable diffraction is not reached, even with a collimator and with the laser considerably distant from the object to be measured.

The figure shows a cylindrical body of fairly large diameter. In this embodiment a pair of lasers 21M and 21N are disposed in parallel relation to the cross section of a metal circular cylinder 22 to be measured and are in such a relation that the emitted beam is tangentially incident upon the circumference. Collimators 25M and 25N are disposed in front of the respective lasers. A well defined diffraction pattern is available upon screen 23 by virtue of gauges 26M and 26N adjacent the tangential circumference portions where the beam appears. Those surfaces of the gauges which face the metal cylinder 22 are precisely finished into smooth planes. As is clear from this embodiment, measurement for fairly large bodies can be accomplished without direct contact with the body, so that the metal cylinder might, in fact, be rotating or easily deformable and the measurement achieved notwithstanding. The gauges 26M and 26N need not necessarily be placed on the transverse plane including the center axis of the metal cylinder 22, but may be translated perpendicularly to the screen 23 to a more suitable or convenient position. In order to maintain the diffraction pattern, the distance between the lower generating line of the metal cylinder 22 and the upper surface of the gauge 26N as seen from the laser 21N is kept constant.

Figure 4:
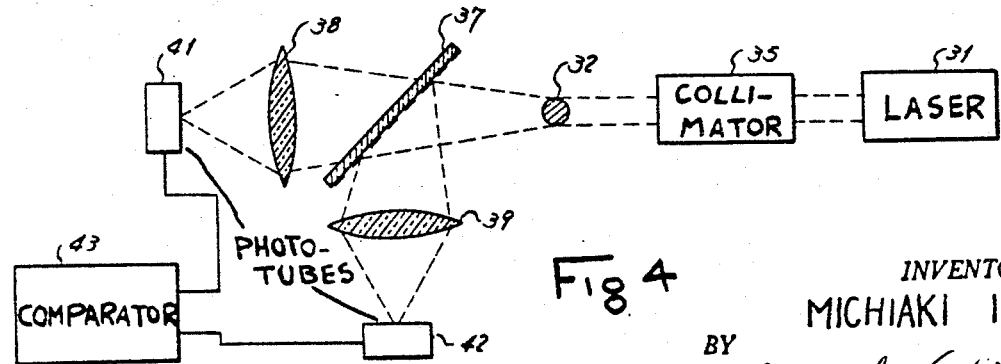

While the above embodiments depict manual or visual type measurements, it is also possible to perform these measurements automatically. FIG. 4 shows an example of such an automated device. In this embodiment, a laser 31 and collimator 35 are shown illuminating a small diameter fiber 32. A half-silvered mirror 37 receives the diffraction pattern and passes it to a first condenser lens 38 which condenses the light having passed through the mirror 37 and a second condenser lens 39 which condenses the light reflected at the mirror 37. Photoelectric tubes 41 and 42, are disposed at the foci of these lenses to catch the transmitted and the reflected light beams, respectively; and a comparator or ratio meter 43 measures the ratio of the photoelectric currents produced by the photoelectric tubes. Since the diffraction patterns of the fibers 32 are predictable, a patterned coating is applied to the mirror 37 so that it is transparent and reflective according to the diffraction pattern of a standard body. Where the diameter of the object being measured deviates from the standard, the difference in the pitch of the interference fringes results in change in the ratio of the transmitted and the reflected beams. This change is measured by the ratio meter 43.

Thus the inventive device is suitable for maintaining the quality of an elongated electric wire or fiber by continuously inspecting the diameter during manufacture. In this case it is also possible to use a cylindrical lens as the collimator 35. Further, the photoelectric tubes 41 and 42 may be any photoelectric converters, such as photocells or cadmium sulfide cells. An example of the ratio meter 43 is the Hewlett-Packard 416. Where a ratio meter of this type is used, it is necessary to intensity-modulate the laser light at the source 31 with 1000 c./s. signal, in the usual manner.

In the embodiments thus far explained, the light sources are gas lasers because of the excellent coherency of the output light. Where the coherency of the output light is not a problem, it is possible to use a ruby or other solid laser. The screen for receiving the diffraction pattern need not be planar, but may be spherical or cylindrical.

In the embodiments of FIGS. 3 and 4, it is possible to read dimensions directly from a calibrated scale on the collimator which is adjusted for each object so as to produce a standard diffraction pattern.

It would also be possible to image the diffraction pattern upon a screen which included a photoconductive or resistive coating conforming to the expected pattern. The degree to which the coating has been influenced by the light might then be precisely compared to a predetermined standard by use, for example, of a Wheatstone bridge.

Thus, according to the invention, it is possible to adapt the shape of the wave front and the intensity distribution near the object to be measured for the best possible observation of the diffraction pattern.

With the measuring device of the invention, the following diffraction patterns will be observed for the respective shapes of the objects to be measured; for a circular hole formed through an opaque body, concentric dark and light interference fringes; for a slit, parallel fringes; for a circular disc and a strip, fringes with inversed illumination distribution as compared with the foregoing; for a wedge-like hole, straight traces extending along the extensions of the two lines forming the wedge shape; and so forth. Since the distinctiveness of these diffraction patterns is not adversely affected by the distance between the object and the screen or other plane of observation, this allows an optional distance selection.

It is thus possible according to this invention to select an arrangement among the light source, the object to be measured, and the means for observing the diffraction pattern, such that a measurement is feasible even when the object is placed within a vacuum envelope or in an atmosphere of high or extremely low temperature and, if high-speed photography or a similar method is resorted to, even when the object is rotating or otherwise moving at a high speed.

While the principles of the invention have been described in connection with specific apparatus, it is to be clearly understood that this description is made only by way of example and not as a limitation to the scope of the invention as set forth in the objects thereof and in the accompanying claim.

I claim:
1. A dimension measuring device comprising means for producing a substantially coherent light beam having an ellipsoidal wave front; means for supporting the object to be measured in the path of said beam; collimator means interposed between said light means and said object for variably transforming the shape of said wave front and adjusting the intensity distribution of said light beam; and means for identifying the pattern of the diffracted light which comprises a half-silvered mirror disposed in the path of the coherent light beam having a transmitting reflecting-film disposed thereon of a configuration corresponding to the diffraction pattern produced by an object of predetermined typical dimensions; a pair of light responsive means for producing electric current proportional to light beams transmitted by and reflected by said half-silvered mirror, respectively; and means for comparing said currents.

References Cited
UNITED STATES PATENTS

| | | | |
|---|---|---|---|
| 2,505,316 | 4/1950 | Wilmotte et al. | 88—14 |
| 3,064,519 | 11/1962 | Shelton. | |
| 3,112,355 | 11/1963 | Ross | 350—294 |

RONALD L. WIBERT, Primary Examiner

P. K. GODWIN, Jr., Assistant Examiner

U.S. Cl. X.R.

250—219; 350—162; 356—113